(12) United States Patent
Kuss

(10) Patent No.: US 11,383,457 B2
(45) Date of Patent: Jul. 12, 2022

(54) METHOD FOR OPERATING A TUBULAR BAG MACHINE AND TUBULAR BAG MACHINE

(71) Applicant: ROVEMA GMBH, Fernwald (DE)

(72) Inventor: Gerhard Kuss, Wetzlar (DE)

(73) Assignee: ROVEMA GMBH, Fernwald (DE)

( * ) Notice: Subject to any disclaimer, the term of this patent is extended or adjusted under 35 U.S.C. 154(b) by 233 days.

(21) Appl. No.: 16/613,706

(22) PCT Filed: May 16, 2018

(86) PCT No.: PCT/EP2018/062712
§ 371 (c)(1),
(2) Date: Nov. 14, 2019

(87) PCT Pub. No.: WO2018/215258
PCT Pub. Date: Nov. 29, 2018

(65) Prior Publication Data
US 2020/0290295 A1    Sep. 17, 2020

(30) Foreign Application Priority Data
May 23, 2017    (DE) .................. 10 2017 208 767.6

(51) Int. Cl.
*B29C 65/00*    (2006.01)
*B29C 65/18*    (2006.01)
(Continued)

(52) U.S. Cl.
CPC .......... *B29C 66/9241* (2013.01); *B29C 65/18* (2013.01); *B29C 66/1122* (2013.01);
(Continued)

(58) Field of Classification Search
CPC ..... B29C 65/02; B29C 65/18; B29C 66/1122; B29C 66/4312; B29C 66/83543;
(Continued)

(56) References Cited

U.S. PATENT DOCUMENTS

| | | | | |
|---|---|---|---|---|
| 5,117,612 A | * | 6/1992 | Keim | ............... B29C 65/18 |
| | | | | 53/451 |
| 5,439,539 A | * | 8/1995 | McLean | ............... B29C 66/96 |
| | | | | 156/64 |
| 5,653,085 A | | 8/1997 | Suga | |

FOREIGN PATENT DOCUMENTS

DE            69418297 T2    11/1999
DE        102013203295 A1     8/2014
(Continued)

OTHER PUBLICATIONS

Machine translation of DE 102013203295 date unknown.*

*Primary Examiner* — John L Goff, II
(74) *Attorney, Agent, or Firm* — Dickinson Wright PLLC; Andrew D. Dorisio

(57) ABSTRACT

A method for operating a tubular bag machine with a drive control system and multiple electronic drive units controlled independently of each other for driving functional elements of the packing machine in a cycle time-synchronous manner through predefined motion sequences, one drive unit being a transverse sealing unit with a drive motor driving two transverse sealing jaws for transversely sealing a film tube, and at least conversion functions for converting the drive torque and the position of the drive motor into the sealing force between the transverse sealing jaws being stored or calculated in the drive control system, the method including determining the operating temperature of the transverse sealing jaws, selecting or calculating a conversion function as a function of the operating temperature, using the temperature-dependent conversion function in calculating the drive torque of the drive motor required to reach a desired target sealing force between the transverse sealing jaws.

7 Claims, 2 Drawing Sheets

(51) Int. Cl.
  *B65B 51/30* (2006.01)
  *B65B 57/00* (2006.01)
  *B29L 31/00* (2006.01)
  *B65B 51/10* (2006.01)

(52) U.S. Cl.
  CPC .... *B29C 66/4312* (2013.01); *B29C 66/82265* (2013.01); *B29C 66/8511* (2013.01); *B29C 66/91231* (2013.01); *B29C 66/9292* (2013.01); *B65B 51/303* (2013.01); *B65B 57/00* (2013.01); *B29L 2031/7128* (2013.01); *B65B 2051/105* (2013.01)

(58) Field of Classification Search
  CPC .............. B29C 66/849; B29C 66/8246; B29C 66/82265; B29C 66/87; B29C 66/8511; B29C 66/876; B29C 66/872; B29C 66/43121; B29C 66/43122; B29C 66/43123; B29C 66/43129; B29C 66/832; B29C 66/834; B29C 66/8491; B29C 66/851; B29C 66/90; B29C 66/91212; B29C 66/91213; B29C 66/9192; B29C 66/92; B29C 66/922; B29C 66/9221; B29C 66/92211; B29C 66/9231; B29C 66/92311; B29C 66/924; B29C 66/9241; B29C 66/92431; B29C 66/92441; B29C 66/92443; B29C 66/92445; B29C 66/92451; B29C 66/9261; B29C 66/92611; B29C 66/92613; B29C 66/92615; B29C 66/92651; B29C 66/92653; B29C 66/92655; B29C 66/929; B29C 66/9292; B29C 66/92921; B29C 66/95; B29C 66/9592; B29C 66/96; B29C 66/961; B29C 66/963; B29C 66/91231; B65B 51/303; B65B 2051/105; B65B 57/00; B65B 57/18; B65B 65/02; B29L 2031/7128; B32B 41/00; B32B 2041/04; B32B 2041/06
  USPC ....... 156/64, 358, 359, 378; 53/75, 507, 451
  See application file for complete search history.

(56) References Cited

FOREIGN PATENT DOCUMENTS

EP 0368016 A2 5/1990
WO 2012152403 A2 11/2012

* cited by examiner

METHOD FOR OPERATING A TUBULAR BAG MACHINE AND TUBULAR BAG MACHINE

FIELD OF THE INVENTION

The invention relates to a method for operating a tubular bag machine. Furthermore, the invention relates to a tubular bag machine for implementing the method according to the invention.

BACKGROUND OF THE INVENTION

Tubular bag machines are generically equipped with a drive control system which can control multiple electronic drive units independently of each other. This allows the different functional elements of the packing machine, in particular the sealing units, to be driven in a cycle time-synchronous manner as they are going through predefined motion sequences.

The method according to the invention is directed at the operation of the transverse sealing unit of a tubular bag machine. The transverse sealing unit of generic tubular bag machines comprises at least one drive motor which can be used to drive two transverse sealing jaws which are drivable relative to each other. The drive motor may be realized in the manner of a servomotor, a geared servomotor or a torque motor, for example. Using the transverse sealing jaws, the film tubes are sealed transversely to the conveying direction when producing the tubular bags. To this end, the transverse sealing jaws are closed, thus clamping the film web of the tubular bag between them and sealing it through introduction of process heat. When sealing the tubular bags using the transverse sealing jaws, the operator predefines a specific target sealing force with which the packaging film has to be compressed between the transverse sealing jaws during the sealing process. To be able to exert the required pressure in the process zone during sealing, the transverse sealing jaws have to be closed with said predefined target sealing force. Since measuring of the sealing force between the driving jaws is frequently impossible or requires complex technological solutions, it is often the drive torque of the drive motor that is predefined in known tubular bag machines instead of the sealing force. This is because the drive torque of the drive motor can be measured by very simple means, in particular if servomotors are used as drive motors.

Aside from the drive torque, the respective position of the drive motor is also measured because this allows the preload of the transverse sealing unit to be set precisely.

To be able to easily convert the sealing force required for sealing into the drive torque to be produced by the drive motor, a conversion function by way of which the desired sealing force can be converted into the drive torque to be produced is provided in the drive control system of known tubular bag machines. The conversion function can be stored in table form as value pairs composed of the sealing force and the drive torque or there may be a mathematical conversion function using which the sealing force and the required drive torque can be converted.

One problem of known tubular bag machines is that the impact of the operating temperature of the transverse sealing jaws on the conversion between the sealing force desired and the drive torque of the drive motor to be produced for it is not taken into account. This is problematic because a change in the operating temperature of the transverse sealing jaws causes significant changes in the dimensions the transverse sealing jaws, said changes affecting the mechanical behavior of the transverse sealing unit, in particular the spring elasticity of the transverse sealing unit. If all sealing processes of the same conversion function are carried out independently of the operating temperature of the transverse sealing jaws, this constitutes a considerable error source because the sealing force reached between the transverse sealing jaws can deviate greatly from the predefined sealing force in practice if the operating temperature is not taken into account.

SUMMARY OF THE INVENTION

Based on this state of the art, the object of the present invention is to propose a novel method for operating a tubular bag machine in which the aforementioned problem is avoided. Furthermore, the object of the present invention is to propose a tubular bag machine for implementing the method according to the invention.

Said object is attained by a method and by a tubular bag machine according to the teaching of the two independent main claims.

Advantageous embodiments of the invention are the subject-matter of the dependent claims.

In the method according to the invention, first the operating temperature of the transverse sealing jaws is determined. To do so, the operating temperature may be measured using a corresponding sensor system or may be entered by operating personnel. Then, a conversion function for converting the desired sealing force into the required drive torque of the drive motor is selected depending on the current operating temperature or is newly calculated. Thus, the selected or newly calculated conversion function precisely matches the current operating temperature of the transverse sealing jaws. Then, the sealing operation of the transverse sealing unit is carried out at a drive torque that has been derived from the desired target sealing force using the temperature-dependent conversion function.

If the new conversion function matching the operating temperature is determined not by new calculation but by selection among different conversion functions stored in the control system, the problem arises that the currently measured operating temperature typically does not exactly match the operating temperatures that are on hand for the stored conversion functions. To be able to solve this problem without substantial conversion errors, particularly advantageously, an interpolation between the two conversion functions whose associated operating temperatures are closest to the detected operating temperature is carried out in these cases when calculating the drive torque required to reach the desired target sealing force.

A particularly convenient operation is achieved if the operating temperature does not have to be measured and entered into the control system by operating personnel, but if the operating temperature of the transverse sealing jaws is instead measured using a temperature sensor and is transmitted directly to the control system. In this way, operating errors can be precluded, in particular.

The method according to the invention can be employed optionally for the intermittent production of tubular bags or for the continuous production of tubular bags. The tubular bag machine according to the invention is characterized in that the current conversion function for converting the desired target sealing force into the required drive torque of the drive motor can be selected or calculated in the drive control system. In other words, this means that either multiple conversion functions of this kind, each associated with a specific operating temperature, are stored in the drive control system and are selected once the current operating temperature of the transverse sealing jaws has been determined. Alternatively, a calculation formula by means of which the conversion function can be precisely derived for each current operating temperature may be stored in the drive control system.

Preferably, the tubular bag machine according to the invention should have a temperature sensor using which the operating temperature of the transverse sealing jaws can be measured. Said current operating temperature is then automatically transmitted to the drive control system, where it is used to select or calculate the current conversion function.

The tubular bag machine according to the invention can either be realized in the manner of an intermittently operating tubular bag machine or in the manner of a continuously operating tubular bag machine.

BRIEF DESCRIPTION OF THE DRAWING FIGURES

An embodiment of the invention is schematically illustrated in the drawings and will be explained by way of example below.

DETAILED DESCRIPTION OF THE INVENTION

Figure 1:
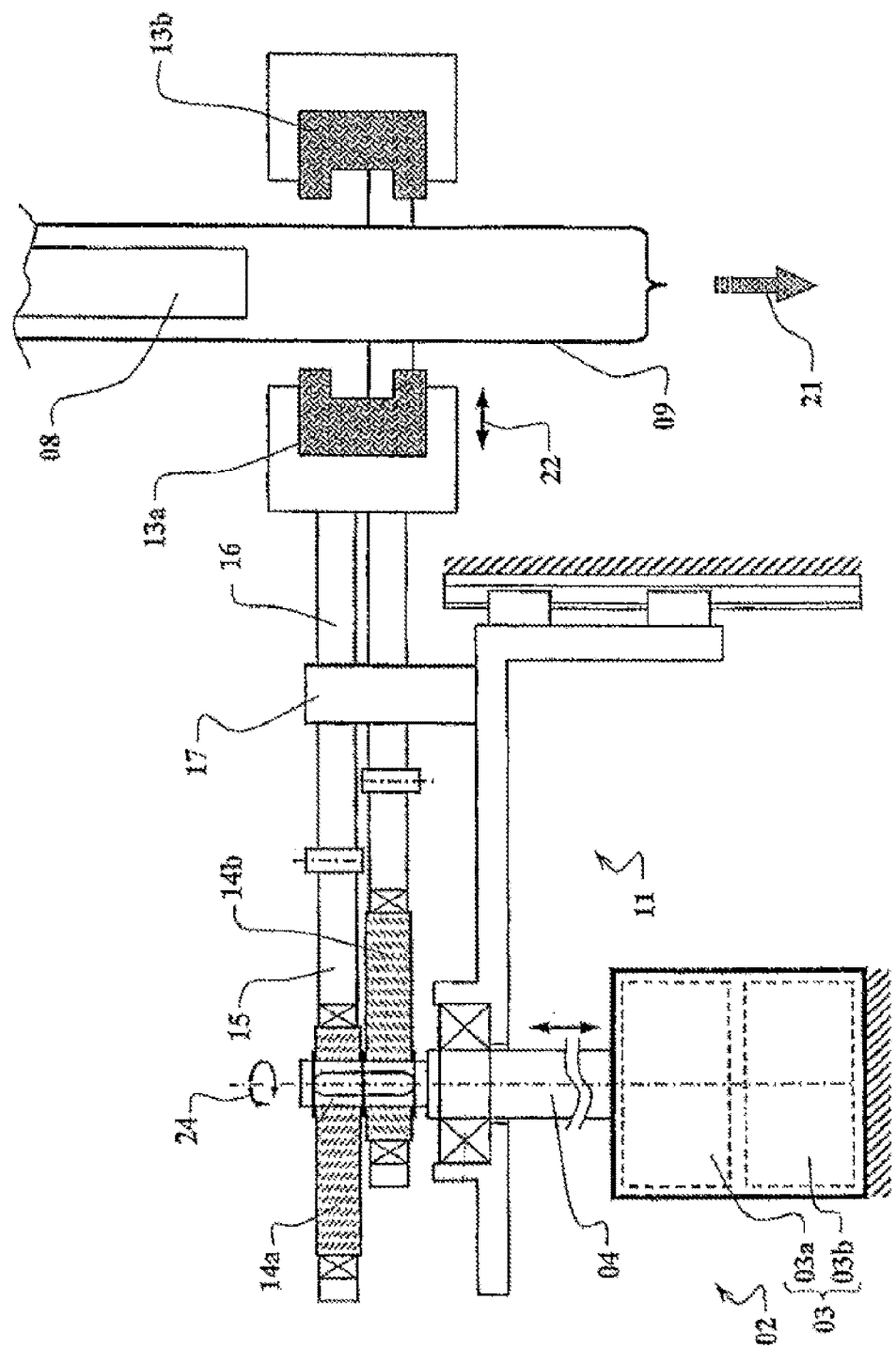
FIG. 1 shows a schematic side view of the transverse sealing unit of a known tubular bag machine.

FIG. 1 is a schematic of an example of the transverse sealing unit of a tubular bag machine comprising two transverse sealing jaws 13a and 13b which are moveable relative to each other.

An endlessly produced film tube 09 which can be filled with material to be packaged by means of a filling tube 08 is visible in FIG. 1. Film tube 09 is transported in conveying direction 21. To produce the individual tubular bags, film tube 09 is sealed transversely. Transverse sealing jaws 13a and 13b are used to do so. Said transverse sealing jaws 13a and 13b can be moved toward each other and away from each other in transverse direction 22 transversely to conveying direction 21. In the sealing position, transverse sealing jaws 13a and 13b are moved against each other so that film tube 09 located between them can be compressed depending on the sealing force exerted by transverse sealing jaws 13a and 13b and can be sealed by heating transverse sealing jaws 13a and 13b. The technique for the transverse sealing of tubular bags is known in principle and requires no further explanation.

In the embodiment illustrated in FIG. 1, transverse sealing jaws 13a and 13b are each disposed on support bars 16 which are mounted in a support bar mount 17 so as to be linearly displaceable in the transverse direction. Contrary movement of transverse sealing jaws 13a and 13b is realized by means of an eccentric mechanism. To this end, one eccentric element 14a and 14b per support bar 16 is mounted on drive shaft 04 so as to co-rotate therewith. In turn, a coupling element 15 which is connected to associated support bar 16 in a pivoting manner is mounted on each eccentric element 14a and 14b so as to rotate independently thereof. Thus, rotation 24 of drive shaft 04 and, simultaneously, of eccentric elements 14a and 14b can be translated into the alternating movement of respective support bars 16 and thus of transverse sealing jaws 13a and 13b.

Together with coupling element 15 and support bar 16, eccentric elements 14a and 14b disposed on drive shaft 04 form a translation mechanism which translates rotation 24 of drive shaft 04 into an alternating contrary movement of transverse sealing jaws 13a and 13b. The translation mechanism with transverse sealing jaws 13a and 13b is part of transverse sealing unit 11. A drive motor 02 comprising a base 03a and a stator $03b^1$ is provided for driving drive shaft 04. Drive motor 02 is realized in the manner of a drive motor in which the actual position, namely rotation angle φ, and actual torque M can be measured using a corresponding drive controller or a position sensor system, which is not shown in FIG. 1. The drive controller can be used, for example, to measure the power consumption of the drive motor, and the drive torque of the drive motor can be derived from said value using the motor parameters.

[1] Geklärt mit Ste

To be able to tightly press said two transverse sealing jaws 13a and 13b together with a predefined target sealing force, drive motor 02 has to produce a specific drive torque M. Torque M produced by drive motor 02 can be converted into the sealing force acting between sealing jaws 13a and 13b by means of a conversion function. However, the mechanical property of the transverse sealing unit with the mechanical translation between drive motor 02 on the one hand and transverse sealing jaws 13a and 13b on the other hand depends significantly on the operating temperature of transverse sealing jaws 13a and 13b in terms of its stiffness and mechanical behavior.

Figure 2:
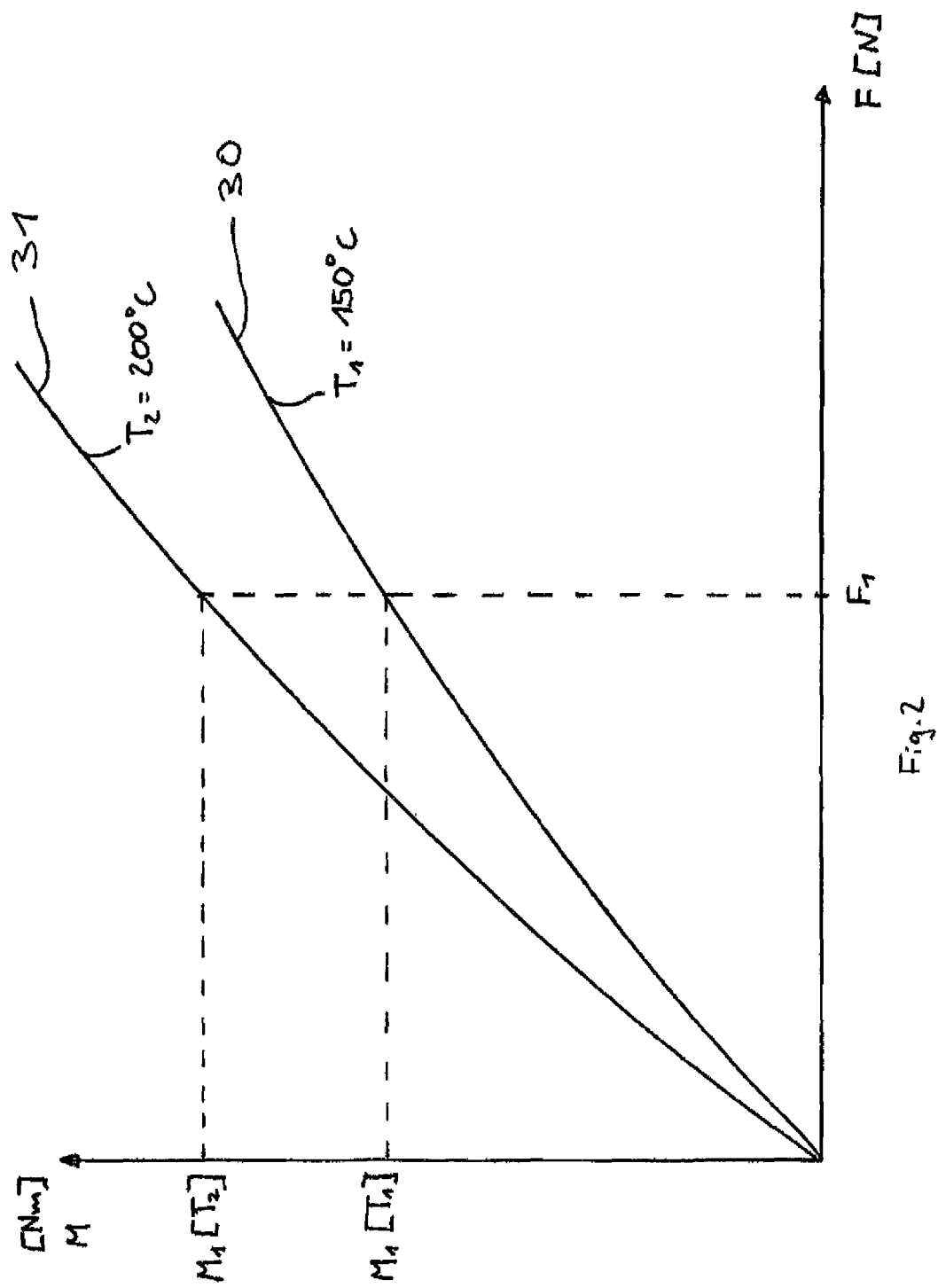
FIG. 2 shows a diagram with two conversion functions for determining the required drive torque of a drive motor from the predefined target sealing force between the transverse sealing jaws.

FIG. 2 shows a diagram with the function graphs of two conversion functions 30 and 31 which describe the correlation between drive torque M of the drive motor and sealing force F between transverse sealing jaws 13a and 13b. Conversion function 30 is associated with an operating temperature of transverse sealing jaws 13a and 13b of 150° C., whereas conversion function 31 is associated with an operating temperature of 200° C. If now a target sealing force F1 is to be exerted between the transverse sealing jaws, a torque M2 derived from conversion function 30 has to be produced by the drive motor at an operating temperature of 150° C.

In contrast, if the operating temperature of transverse sealing jaws 13a and 13b is at a temperature of 200° C., a torque M3 resulting from conversion function 31 has to be produced to establish sealing force F1. Conversion functions 30 and 31, which are schematically illustrated in FIG. 2, and, potentially, other conversion functions for other operating temperatures can be temporarily stored in the drive control system of the tubular bag machine or can alternatively be calculated newly. If a sensor in transverse sealing jaws 13a and 13b now detects a changed operating temperature, a new conversion function is selected or calculated depending on the change of the operating temperature, and this new conversion function is used to convert the target sealing force set by the operator into the drive torque to be produced by drive motor 02. In this way, undesired deviations from the desired sealing force due to a change in the operating temperature in the transverse sealing jaws can be precluded.

The invention claimed is:

1. A method for operating a tubular bag machine, the tubular bag machine comprising a drive control system and multiple electronic drive units which are controlled independently of each other by the drive control system and which drive different functional elements of the tubular bag machine in a cycle time-synchronous manner as they are going through predefined motion sequences, and one drive unit being realized in the manner of a transverse sealing unit, and the transverse sealing unit comprising at least one drive motor (02) and two transverse sealing jaws (13a, 13b) which are driven relative to each other by the drive motor (02) and by means of which a film tube (09) is sealed transversely to a conveying direction (21), and at least conversion functions by way of which a drive torque of the drive motor can be converted into a sealing force between the transverse sealing jaws (13a, 13b) being stored in the drive control system, the method comprising the following steps:

a) determining an operating temperature of the transverse sealing jaws (13a, 13b);

b) selecting a conversion function (30, 31) as a function of the operating temperature;

c) using the conversion function (30, 31) in calculating the drive torque of the drive motor required to reach a desired target sealing force between the transverse sealing jaws (13a, 13b);

wherein once the operating temperature has been determined, two stored conversion functions (30, 31) whose associated operating temperatures are closest to the determined operating temperature are selected, an interpolation being carried out between the two conversion functions (30, 31) when calculating the drive torque required to reach the desired target sealing force.

2. The method according to claim 1, characterized in that the operating temperature of the transverse sealing jaws (13a, 13b) is measured using a temperature sensor.

3. The method according to claim 1, characterized in that the drive units go through a motion sequence for the intermittent production of tubular bags.

4. The method according to claim 1, characterized in that the drive units go through a motion sequence for the continuous production of tubular bags.

5. A tubular bag machine for producing tubular bags, the tubular bag machine comprising:

a drive control system;

multiple electronic drive units which are controlled independently of each other by the drive control system and which drive different functional elements of the tubular bag machine in a cycle time-synchronous manner as they are going through predefined motion sequences;

at least one drive unit comprising a transverse sealing unit, wherein the transverse sealing unit comprises at least one drive motor (02) and two transverse sealing jaws (13a, 13b) which are driven relative to each other by the drive motor (02) and by means of which a film tube (09) is sealed transversely to a conveying direction (21); and at least one temperature sensor adapted to measure an operating temperature of the transverse sealing jaws;

wherein the drive control system is adapted to store a plurality of conversion functions by way of which a drive torque of the drive motor is converted into a sealing force force between the transverse sealing jaws (13a, 13b), wherein a plurality of the conversion functions (30, 31) are stored in the drive control system as a function of the operating temperature of the transverse sealing jaws (13a, 13b); and wherein the drive control system is further adapted to interpolate a drive torque required to reach a desired target sealing force at the operating temperature of the transverse sealing jaws based on two stored conversion functions whose associated operating temperatures are closest to the operating temperature.

6. The tubular bag machine according to claim 5, characterized in that the tubular bag machine is realized in the manner of an intermittently operating tubular bag machine.

7. The tubular bag machine according to claim 5, characterized in that the tubular bag machine is realized in the manner of a continuously operating tubular bag machine.

\* \* \* \* \*